US009253743B2

(12) United States Patent
Mishra et al.

(10) Patent No.: US 9,253,743 B2
(45) Date of Patent: Feb. 2, 2016

(54) SYSTEMS AND METHODS FOR REDUCED LATENCY AND IMPROVED BEACON RECEPTION IN DEVICES CAPABLE OF PROVIDING MULTIPLE WIRELESS INTERFACES VIA A SINGLE RADIO

(71) Applicant: Broadcom Corporation, Irvine, CA (US)

(72) Inventors: Sushant Kumar Mishra, Bangalore (IN); Jayaraman Nagarajan, Bangalore (IN); Gireesh Hegde, Bangalore (IN); Rakesh Raman, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 264 days.

(21) Appl. No.: 13/928,693

(22) Filed: Jun. 27, 2013

(65) Prior Publication Data

US 2015/0003403 A1 Jan. 1, 2015

(51) Int. Cl.
*H04W 56/00* (2009.01)
*H04W 48/12* (2009.01)
*H04W 8/00* (2009.01)

(52) U.S. Cl.
CPC .............. *H04W 56/00* (2013.01); *H04W 48/12* (2013.01); *H04W 8/005* (2013.01)

(58) Field of Classification Search
None
See application file for complete search history.

(56) References Cited

U.S. PATENT DOCUMENTS

| 5,960,344 | A * | 9/1999 | Mahany ................... 455/432.2 |
| 8,537,833 | B2 * | 9/2013 | Tzoreff et al. ........... 370/395.42 |
| 2003/0114204 | A1 * | 6/2003 | Allen et al. ................... 455/574 |
| 2005/0105504 | A1 * | 5/2005 | Sakoda ........................ 370/349 |
| 2006/0234720 | A1 * | 10/2006 | Takizawa et al. ............. 455/453 |
| 2008/0253354 | A1 * | 10/2008 | Eguchi ......................... 370/350 |
| 2010/0002676 | A1 * | 1/2010 | Doi ....................... H04W 74/04 370/345 |
| 2010/0135256 | A1 * | 6/2010 | Lee et al. ....................... 370/336 |
| 2010/0195603 | A1 * | 8/2010 | Ho ........................ H04B 15/00 370/329 |
| 2010/0203832 | A1 * | 8/2010 | Russell et al. ............... 455/41.2 |
| 2013/0150112 | A1 * | 6/2013 | Qi et al. ........................ 455/515 |
| 2014/0140208 | A1 * | 5/2014 | Cherian .............. H04W 56/001 370/230 |

* cited by examiner

*Primary Examiner* — Tito Pham
(74) *Attorney, Agent, or Firm* — Fiala & Weaver P.L.L.C.

(57) ABSTRACT

Systems and methods are described for reducing latency and improving beacon reception by a device capable of providing multiple wireless interfaces via a single radio (a "multi-interface device"). The multi-interface device utilizes the single radio to communicate with a first device over a first wireless channel and to communicate with a second device over a second wireless channel. The multi-interface device determines that a difference in time between a transmission of a first beacon by the first device over the first wireless channel and a transmission of a second beacon by the second device over the second wireless channel is less than a predetermined amount of time. In response to determining that the difference in time is less than the predetermined amount of time, the multi-interface device sends a request to either the first or the second device to shift the transmission of future beacons by a requested offset time.

20 Claims, 8 Drawing Sheets

SYSTEMS AND METHODS FOR REDUCED LATENCY AND IMPROVED BEACON RECEPTION IN DEVICES CAPABLE OF PROVIDING MULTIPLE WIRELESS INTERFACES VIA A SINGLE RADIO

BACKGROUND

1. Technical Field

The present invention generally relates to wireless communication between devices. In particular, the present invention relates to techniques for reducing latency and improving beacon reception in devices, such as wireless local area network (WLAN) devices, that are capable of providing multiple wireless interfaces via a single radio.

2. Background Art

Wireless communication is increasingly becoming the dominant method of interconnecting devices at home, in work environments, and elsewhere. In accordance with a traditional Wi-Fi (i.e., 802.11b/g/n/e/ac standard) WLAN architecture, at least one access point (AP) acts as a central hub that connects Internet service providers and local devices such as laptop computers, tablets, phones, printers, music devices, and televisions. In a traditional WLAN architecture, each local device wirelessly communicates with only one AP at a given time, and each AP may wirelessly communicate with several local devices in turn.

As the popularity of including Wi-Fi interfaces in consumer electronic devices has increased, newer WLAN architectures have emerged that enable local devices to stream media directly to other local devices in a peer-to-peer (P2P) fashion. Communicating in a P2P manner can enable, for example, a consumer to stream audio content being downloaded from an Internet music service onto his handheld device (e.g., a mobile phone or tablet) to a speaker in his home. As another example, communicating in a P2P manner can enable a consumer to stream a movie being downloaded from an Internet movie service onto his handheld device to a television in his home. Examples of P2P Wi-Fi communication are described in the Wi-Fi Direct P2P and Miracast protocol standards.

A P2P WLAN may include an AP, a device having multiple wireless interfaces (a "multi-interface device"), and a P2P device. The multi-interface device concurrently communicates with the AP via a first wireless interface and with the P2P device via a second wireless interface. In accordance with the example use cases discussed above, the multi-interface device may comprise a handheld device such as a mobile phone or tablet and the P2P device may comprise a speaker or television, although these examples are not intended to be limiting. Because many wireless devices, especially handheld devices, are power constrained, it is often impractical for them to include more than one radio to communicate with other wireless devices. To address this issue, some multi-interface devices utilize software intelligence to implement two wireless interfaces simultaneously using a single radio. This mode of operation is sometimes referred to as a concurrent mode of operation. In this mode of operation, the two wireless interfaces can operate on the same channel or a different channel. If the interfaces are operating on the same channel, this may be referred to as concurrent same channel operation. If the interfaces are operating on different channels, this may be referred to as VSDB (Virtual Simultaneous Dual Band) or VSDC (Virtual Simultaneous Dual Channel) operation.

In accordance with VSDB or VSDC operation, software intelligence in the multi-interface device utilizes time division multiplexing (TDM) to periodically switch between the two wireless interfaces so as to effectively receive beacon frames (or simply "beacons") that are periodically sent from two different wireless devices (e.g., an AP and a P2P device). However, there is an overhead associated with switching between channels/bands in this manner. This overhead includes, for example, the time associated with resetting the radio for a particular wireless interface. Consequently, if the beacons being transmitted by the two different wireless devices are too close together in time, it becomes practically impossible to switch from one wireless interface to the other in time quickly enough to avoid missing beacons.

Some software mechanisms exist that address this problem by alternating between the two wireless interfaces such that during a first time period, beacons will be received by the first wireless interface while beacons are missed by the second wireless interface, and then during a second time period, beacons will be received by the second wireless interface while beacons are missed by the first wireless interface. However, this approach introduces latencies which are unacceptable for applications such as screen sharing and Wi-Fi display.

BRIEF SUMMARY

Systems and methods are provided for achieving reduced latency and improved beacon reception in devices capable of providing multiple wireless interfaces via a single radio, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Example embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

The detailed description describes steps corresponding to the flowcharts depicted in the accompanying drawings. It will be recognized that such steps can be performed in any order unless otherwise stated in the application.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Systems and methods for achieving reduced latency and improved beacon reception in devices capable of providing multiple wireless interfaces via a single radio are described herein.

In particular, a method is described herein for controlling beacon reception in a multi-interface device that supports multiple wireless interfaces via a single radio. In accordance with the method, the multi-interface device utilizes the single radio to communicate with a first device over a first wireless channel and a second device over a second wireless channel. In embodiments, the first and the second wireless channels may comprise WLAN channels and/or operate on separate frequency bands. The multi-interface device determines that a difference in time between the transmission of a first beacon by the first device over the first wireless channel and a transmission of a second beacon by the second device over the second wireless channel is less than a predetermined amount of time. In response to determining that the difference in time is less than the predetermined amount of time, the multi-interface device sends a request to either the first device or the second device to shift the transmission of future beacons by a requested offset time.

In one embodiment, the requested offset time is calculated to enable the multi-interface device to utilize the single radio in accordance with a TDM scheme by which each of a continuous series of future beacons transmitted by the first device can be received during time periods in which the single radio is utilized to communicate over the first wireless channel and each of a continuous series of future beacons transmitted by the second device can be received during time periods in which the single radio is utilized to communicate over the second wireless channel.

In one embodiment, sending the request from the multi-interface device to either the first device or the second device includes sending an action frame request to either the first device or the second device. The action frame request includes the requested offset time.

In one embodiment, the multi-interface device receives from either the first device or the second device a response to the request that was sent to either the first or second device. The response indicates whether the request was rejected or accepted.

In further accordance with such an embodiment, the response comprises an action frame response. The action frame response includes a reason code that indicates whether the request has been rejected or accepted and, if the request has been accepted, an actual offset time by which future beacons will be shifted is also included in the action frame response. If the request has been accepted, the action frame response may further include a number of interim beacons that will be transmitted by either the first device or the second device before the future beacons are shifted by the indicated actual offset time.

In one embodiment, the multi-interface device determines from the response whether the first device or the second device has accepted or rejected the request. In response to determining that the first device or the second device has accepted the request, the multi-interface device utilizes the single radio in accordance with a TDM scheme by which each of a continuous series of future beacons transmitted by the first device can be received during time periods in which the single radio is utilize to communicate over the first wireless channel, and each of a continuous series of future beacons transmitted by the second device can be received during time periods in which the single radio is utilized to communicate over the second wireless channel. In response to determining that the first device or the second device has rejected the request, however, the multi-interface device may utilize the single radio in accordance with a TDM scheme by which only a subset of a continuous series of future beacons transmitted by the first device can be received during time periods in which the single radio is used to communicate over the first wireless channel, and only a subset of a continuous series of future beacons transmitted by the second device can be received during time periods in which the single radio is used to communicate over the second wireless channel.

A method is also described herein that is performed by a device for responding to a request from a multi-interface device that supports multiple wireless interfaces via a single radio, each of the wireless interfaces being operable to communicate over one of a plurality of different wireless channels. In accordance with the method, the device receives a request from the multi-interface device to shift the time at which future beacons will be transmitted over a particular one of the plurality of different wireless channels by a requested offset time. The future beacons are part of a series of beacons transmitted by the device over the particular wireless channel. The device determines whether to accept or reject the request. In response to determining that the request is to be accepted, the device sends a response to the multi-interface device that includes an indication that the device will shift the time at which the future beacons will be transmitted over the particular wireless channel.

In one embodiment, the response to the request includes an actual offset time indicating the amount of time by which the transmission of future beacons will be shifted by the device. The response may further include a number of interim beacons that will be transmitted by the device before the future beacons are shifted by the actual offset time. The device may further send the interim beacons over the particular wireless channel. Each interim beacon may include an information element that specifies a number of interim beacons that remain before the future beacons are shifted by the actual offset time.

A multi-interface device is also described herein. The multi-interface device includes a radio, wireless interface control logic, an overlapping beacon detector, and a request unit. The wireless interface control logic is configured to provide multiple wireless interfaces via the radio, the multiple wireless interfaces including a first wireless interface for communicating over a first wireless channel and a second wireless interface for communicating over a second wireless channel. In embodiments, the first and the second wireless channels may operate on separate frequency bands and/or comprise WLAN channels. The overlapping beacon detector is configured to determine that a difference in time between a transmission of a first beacon by a first device over the first wireless channel and a transmission of a second beacon by a second device over the second wireless channel is less than a predetermined amount of time. The request unit is configured to send a request from the multi-interface device to either the first device or the second device to shift the sending of future beacons by a requested offset time in response to the determination that the difference in time is less than the predetermined amount of time.

In one embodiment, the requested offset time is calculated to enable the wireless interface control logic to utilize the single radio in accordance with a TDM scheme by which each of a continuous series of future beacons transmitted by the first device can be received during time periods in which the radio is used to communicate over the first wireless channel and each of a continuous series of future beacons transmitted by the second device can be received during time periods in which the radio is used to communicate over the second wireless channel.

In another embodiment, the multi-interface device further includes a response unit. The response unit is configured to receive from either the first device or the second device a response to the request sent to either the first device or the second device. The response indicates whether the request was accepted or rejected.

In further accordance with such an embodiment, the response unit may be further configured to determine from the response whether the first device or the second device has accepted or rejected the request.

In still further accordance with such an embodiment, the wireless interface control logic may be further configured to, in response to a determination by the response unit that the first device or the second device has accepted the request, utilize the radio in accordance with a TDM scheme by which each of a continuous series of future beacons transmitted by the first device can be received during time periods in which the radio is utilized to communicate over the first wireless channel, and each of a continuous series of future beacons transmitted by the second device can be received during time periods in which the radio is utilized to communicate over the second wireless channel. The wireless interface control logic may also be configured to, in response to a determination by the response unit that the first device or the second device has rejected the request, utilize the radio in accordance with a TDM scheme by which only a subset of a continuous series of future beacons transmitted by the first device can be received during time periods in which the radio is utilized to communicate over the first wireless channel and only a subset of a continuous series of future beacons transmitted by the second device can be received during time periods in which the radio is utilized to communicate over the second wireless channel.

Example embodiments will now be described. In particular, in Section B, an example wireless communication system that includes embodiments for reducing latency and improving beacon reception in a device that is capable of providing multiple wireless interfaces via a single radio is described. In Section C, an example computer that may be used to implement certain embodiments described herein will be described. Finally, in Section D, some concluding remarks will be provided.

B. Example System Implementation

Figure 1:
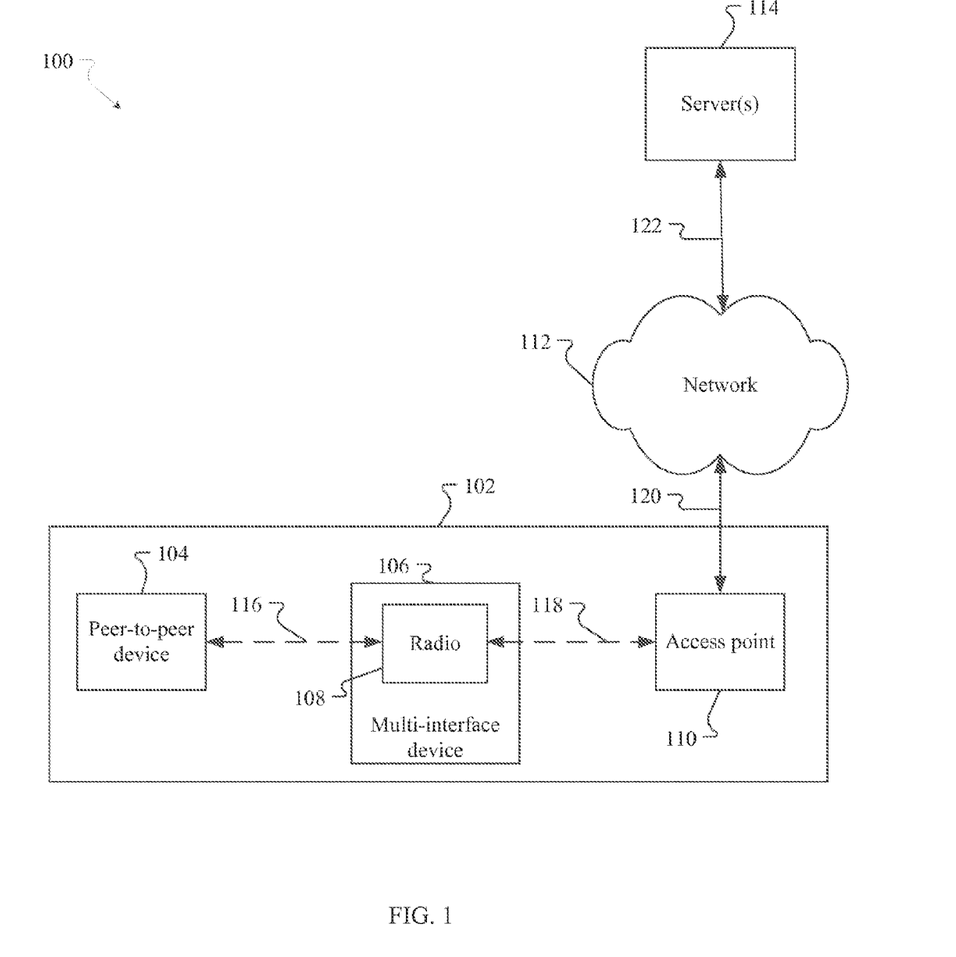
FIG. 1 is a block diagram of an example wireless communication system that includes a multi-interface device that supports multiple wireless interfaces via a single radio in accordance with an embodiment.

FIG. 1 depicts a block diagram of an example wireless communication system 100 that includes a multi-interface device that supports multiple wireless interfaces via a single radio in accordance with an embodiment. In particular, as shown in FIG. 1, wireless communication system includes a WLAN 102 that includes a peer-to-peer (P2P) device 104, a multi-interface device 106 that includes a radio 108, and an access point (AP) 110. Wireless communication system 100 further includes a network 112 and one or more servers 114.

Generally speaking, wireless communication system 100 operates to enable information to be transmitted from AP 110 to P2P device 104 through multi-interface device 106, which maintains concurrent communications with both AP 110 and P2P device 104. AP 110 may communicate directly or indirectly with server(s) 114 that contain information that may be streamed to P2P device 104. The information may include video content, audio content, documents (e.g., Web pages), images, output of executables, and/or other types of information. For example, wireless communication system 100 may be used to stream a video from AP 110 to P2P device 104 through multi-interface device 106 so that the video can be displayed by P2P device 104.

Multi-interface device 106 maintains wireless connections to P2P device 104 and AP 110 via the same radio 108. Communication between P2P device 104 and multi-interface device 106 via radio 108 is conducted over a wireless connection 116, represented by a dotted double-arrow. Communication between AP 110 and multi-interface device 106 via radio 108 is conducted over a wireless connection 118, also represented by a dotted double-arrow. Radio 108 and wireless connections 116 and 118 may employ 802.11b/g/n/e/ac IEEE (Wi-Fi) standards, the Wi-Fi Direct P2P (WFD) standards, or any other wireless standard.

Multi-interface device 106 may utilize radio 108 to concurrently maintain wireless connections 116 and 118 over the same wireless channel. Alternatively, multi-interface device 106 may utilize radio 108 to concurrently maintain wireless connections 116 and 118 over different wireless channels. For example, multi-interface device 106 may employ TDM to manage concurrent communication with P2P device 104 and AP 110 by periodically switching between different wireless channels. Each wireless channel may be defined by a central frequency and a frequency range. For example, in the 802.11g/n standard, operation channel 1 is centered on 2412 MHz and covers a range of 20 MHz. In addition to operating on different wireless channels, wireless connections 116 and 118 may operate on different frequency bands. A band may be defined as a range of frequencies. For example, the 802.11 standards workgroup has identified bands that start at each of the following frequencies: 2.4 GHz, 3.6 GHz and 4.9/5.0 GHz.

Communication between AP 110 and network 112 is carried out over a network connection 120. Communication between server(s) 114 and network 112 is carried out over a network connection 122. Network connections 120 and 122 may be implemented using well-known network communication protocols. Network 112 may be a wide-area network (e.g., the Internet), a local area network (LAN), another type of network, or a combination thereof.

WLAN 102 components P2P device 104, multi-interface device 106, and AP 110 each comprise wireless devices that include at least one wireless interface capable of transmitting information to and receiving information from other wireless devices. As noted above, multi-interface device 106 is capable of communicating with at least two wireless devices over single radio 108. AP 110 is further enabled to communicate with server(s) 114 over network 112 via a separate wired or wireless interface.

In one example implementation, AP 110 comprises a wireless router, multi-interface device 106 comprises a handheld device such as a mobile phone or tablet, and P2P device 104 comprises a media playing device, such as a television or speaker. In accordance with such an implementation, the handheld device may receive video or audio content from the wireless router (which in turn downloads it from server(s) 114) and transmits such content to the media playing device for playback thereby. However, this example is not intended to be limiting and persons skilled in the relevant art(s) will readily appreciate that AP 110, multi-interface device 106 and P2P device 104 may comprise any of a wide variety of other types of devices that incorporate wireless communication functionality.

The three WLAN 102 components in FIG. 1 are shown for illustrative purposes only and are not intended to be limiting. It will be recognized by persons skilled in the relevant art(s) that wireless communication system 100 may include any number of wireless devices and WLANs. It will be further recognized that AP 110 is included only for illustrative purposes and that WLAN 102 need not include AP 110. Rather, AP 110 may be replaced by any another wireless device, including another P2P device. Alternatively, there may be more than one AP in WLAN 102. P2P device 104, multi-interface device 106, and AP 110 may each be further in communication with one or more other devices, wired or wirelessly.

Server(s) 114 are intended to represent systems or devices capable of communicating with at least AP 110 via network 112. Server(s) 114 may be configured to execute computer programs that operate to provide information to users in response to receiving requests therefrom. For example, the information may include documents (e.g., Web pages) images, video content, audio content, output of executables, or any other type of information. In accordance with some example embodiments, server(s) 114 are configured to host respective Web sites, so that the Web sites are accessible to users of wireless communication system 100. In accordance with further embodiments, server(s) 114 may be configured to stream video content, audio content, and/or other media, so that the video content, audio content, and/or other media are accessible to users of wireless communication system 100.

In one embodiment, each of AP 110 and P2P device 104 periodically transmit beacon frames (or "beacons") to multi-interface device 106. Such beacons may comprise messages that are periodically sent between wireless devices that contain essential information that allows the wireless devices to maintain communication directly with one another. For example, beacons may contain information that enables a device receiving the beacon to know when to expect a next beacon. Beacons may also include data payloads in addition to communication maintenance information. For example, beacons may include multicast messages that contain streaming media. Beacons may take different lengths of time to transmit depending on the length of the beacon message and the speed of the wireless connection between devices.

As noted above, multi-interface device 106 can employ a TDM scheme to concurrently carry out communication with AP 110 over a first wireless channel and with P2P device 104 over a second wireless channel utilizing the same radio 106. In other words, the TDM scheme may be employed to provide two wireless interfaces using single radio 106. One challenge associated with employing such a TDM scheme is the problem of ensuring that the beacons that are periodically transmitted by each of AP 110 and P2P device 104 are received by multi-interface device 106. As noted in the Background Section above, there is an overhead associated with switching between the first and second wireless channel. This overhead includes, for example, the time associated with resetting radio 108 for a specific wireless interface. Consequently, if the beacons being transmitted by AP 110 and P2P device 104 are too close together in time, it becomes practically impossible to switch from one wireless interface to the other in time quickly enough to avoid missing beacons.

Figure 2:
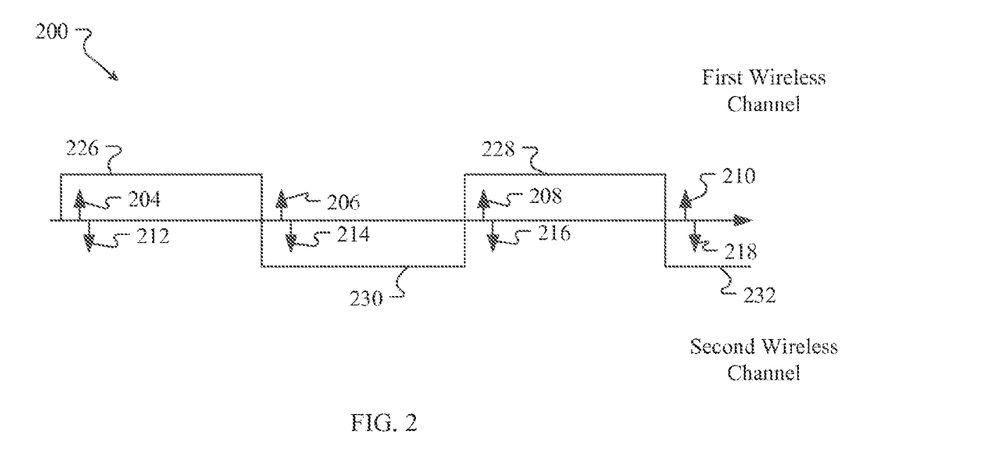
FIG. 2 is a timeline that illustrates an overlapping beacon mode of operation of a multi-interface device that supports multiple wireless interfaces via a single radio in accordance with an embodiment.

To address this issue, multi-interface device 106 may operate in what is called an "overlapping beacon mode." An example of this mode of operation is illustrated in a timeline 200 of FIG. 2. In particular, timeline 200 illustrates the time-division-multiplexed utilization of radio 108 over time to provide a first wireless interface for communicating with AP 110 over a first wireless channel and a second wireless interface for communicating with P2P device 104 over a second wireless channel in an overlapping beacon mode of operation. In particular, during the time periods designated time periods 226 and 228, radio 108 is utilized to provide the first wireless interface for communicating with AP 110 over the first wireless channel and during the time periods designated time periods 230 and 232, radio 108 is utilized to provide the second wireless interface for communicating with P2P device 104 over the second wireless channel.

As also shown in timeline 200, during the same timeframe, AP 110 periodically transmits each of continuous series of beacons designated beacons 204, 206, 208 and 210 over the first wireless channel and P2P device 104 periodically transmits each of a continuous series of beacons designated beacons 212, 214, 216 and 218 over the second wireless channel. As can be seen, such beacons are transmitted by AP 110 and P2P device 104 in close temporal proximity with each other. For example, beacon 204 is transmitted by AP 110 in close temporal proximity with the transmission of beacon 212 by P2P device 104. For the purposes of this example, it is to be assumed that the difference in time between the transmission of beacon 204 and the transmission of beacon 212 is so small so as to render it impractical or impossible for multi-interface device 106 to switch between wireless interfaces in order to receive both beacons. The same temporal relationship exists between beacons 206 and 214, beacons 208 and 216, and beacons 210 and 218.

Due to the close temporal proximity of the transmission of beacons by AP 110 and P2P device 104, the overlapping beacon mode of operation shown in timeline 200 is utilized. This mode of operation represents a compromise approach for receiving beacons in which some beacons will be missed by multi-interface device 106 as a matter of necessity. For example, during time period 226 in which radio 108 is utilized to communicate with AP 110 over the first wireless channel, beacon 204 can be received from AP 110 over the first wireless channel. However, during the same time period, beacon 212 that was transmitted by P2P device 104 over the second wireless channel will be missed. Likewise, during time period 230 in which radio 108 is utilized to communicate with P2P device 104 over the second wireless channel, beacon 214 can be received from P2P device 104 over the second wireless channel. However, during the same time period, beacon 206 that was transmitted by AP device 110 over the first wireless channel will be missed.

There are adverse consequences that can result from the missing of beacons in the overlapping beacon mode of operation illustrated in FIG. 2. Such adverse consequences can include, for example and without limitation, increased latency, the missing of multicast frames that are included in DTIM (Delivery Traffic Indication Message) beacons, and the imposition of increased buffering requirements on AP 110 and/or P2P device 104, each of which may be required to buffer packets to be transmitted to multi-interface 106 during time periods in which multi-interface device 106 is "off-channel."

Figure 3:
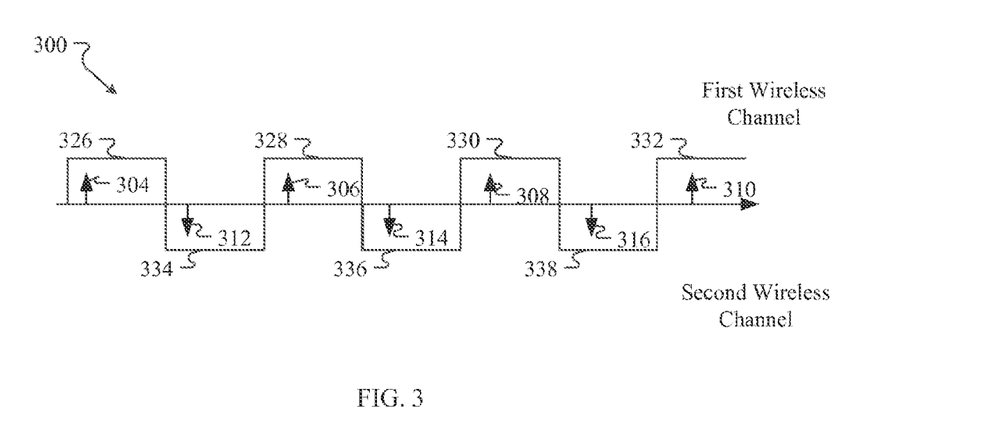
FIG. 3 is a timeline that illustrates a non-overlapping beacon mode of operation of a multi-interface device that supports multiple wireless interfaces via a single radio in accordance with an embodiment.

In contrast, if the transmission of beacons by AP 110 and P2P device 104 are sufficiently separated in time, multi-interface device 106 can operate in what is called a "non-overlapping beacon mode." An example of this mode of operation is illustrated in a timeline 300 of FIG. 3. In particular, timeline 300 illustrates the time-division-multiplexed utilization of radio 108 over time to provide a first wireless interface for communicating with AP 110 over a first wireless channel and a second wireless interface for communicating with P2P device 104 over a second wireless channel in a non-overlapping beacon mode of operation. In particular, during the time periods designated time periods 326, 328, 330 and 332, radio 108 is utilized to provide the first wireless interface for communicating with AP 110 over the first wireless channel and during the time periods designated time periods 334, 336, and 338, radio 108 is utilized to provide the second wireless interface for communicating with P2P device 104 over the second wireless channel.

As also shown in timeline 300, during the same timeframe, AP 110 periodically transmits each of continuous series of beacons designated beacons 304, 306, 308 and 310 over the first wireless channel and P2P device 104 periodically transmits each of a continuous series of beacons designated beacons 312, 314 and 316 over the second wireless channel. In contrast to the scenario depicted in FIG. 2, such beacons are transmitted by AP 110 and P2P device 104 with sufficient temporal spacing to enable multi-interface device 106 to switch between wireless interfaces in order to receive all beacons. For example, during time periods 326, 328, 330 and 332, in which radio 108 is utilized to communicate with AP 110 over the first wireless channel, beacons 304, 306, 308 and 310 can be respectively received from AP 110 over the first wireless channel. Likewise, during time periods 334, 336 and 338, in which radio 108 is utilized to communicate with P2P device 104 over the second wireless channel, beacons 312, 314 and 316 can be respectively received from P2P device 104 over the second wireless channel. Since no beacons are missed, the non-overlapping beacon mode of operation is preferable to the overlapping beacon mode of operation discussed above in reference to FIG. 2.

In an embodiment, multi-interface device 106 can operate in either an overlapping beacon mode of operation or a non-overlapping beacon mode of operation when communicating with two or more wireless devices, such as AP 110 and P2P device 104. The mode can be determined at device startup and/or at any point in operation once a wireless connection between multi-interface device 106 and the two or more devices has been established. It is preferable that multi-interface device 106 operate in a non-overlapping beacon mode to improve information throughput and to avoid dropping important messages such as beacons, multicast packets, and other data. It is especially important to ensure that multi-interface device 106 is operating in non-overlapping beacon mode in the case when multi-interface device 106 is streaming media to a P2P device, such as P2P device 104.

In an embodiment, to help facilitate operation in the non-overlapping beacon mode, multi-interface device 106 is configured to determine whether the transmission of beacons by AP 110 and P2P device 104 are sufficiently spaced apart in time to allow for operation in the non-overlapping beacon mode. If such transmissions are sufficiently spaced apart in time, then multi-interface device 106 will operate in the non-overlapping beacon mode. However, if such transmissions are not sufficiently spaced apart in time, then multi-interface device 106 will send a request to either AP 110 or P2P device 104 to shift the time at which future beacons are transmitted by a particular offset time. The offset time is calculated to enable multi-interface device 106 to operate in the non-overlapping beacon mode. Generally speaking, AP 110 or P2P device 104 may either accept or reject the request. If the request is accepted, AP 110 or P2P device 104 will then take steps to shift its beacon transmission times, thereby enabling multi-interface device 106 to operating in the non-overlapping beacon mode. Further details concerning these features of multi-interface device 106, P2P device 104 and AP 110 will now be provided.

Figure 4:
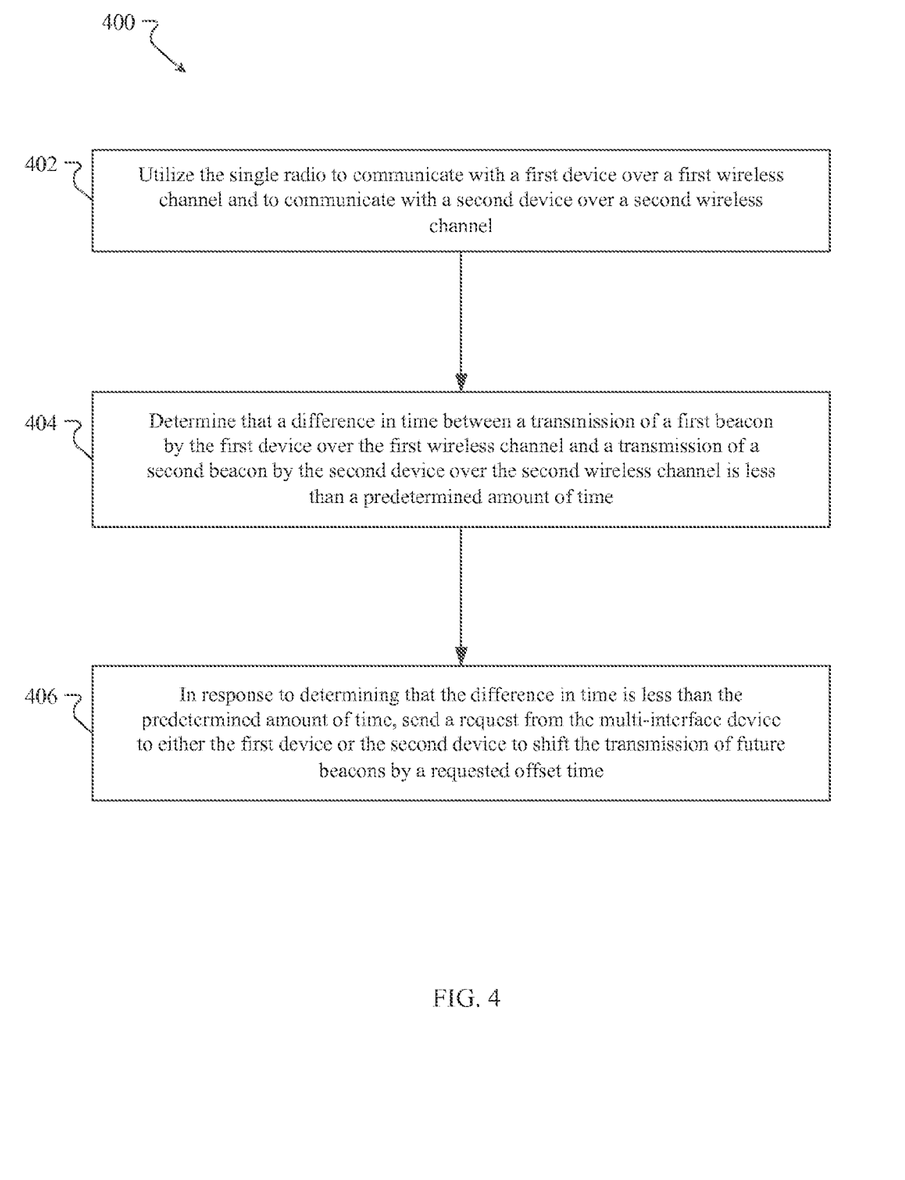
FIG. 4 depicts a flowchart of a method for controlling beacon reception in a multi-interface device that supports multiple wireless interfaces via a single radio in accordance with an embodiment.

In particular, FIG. 4 depicts a flowchart 400 of an example method for controlling beacon reception in a multi-interface device that supports multiple wireless interfaces via a single radio in accordance with an embodiment. The method of flowchart 400 may be performed by multi-interface device 106 as described above in reference to FIG. 1, although the method is not limited to that embodiment.

As shown in FIG. 4, the method of flowchart 400 begins at step 402. In step 402, a multi-interface device utilizes a single radio to communicate with a first device over a first wireless channel and to communicate with a second device over a second wireless channel. For example, with continued reference to FIG. 1, multi-interface device 106 may utilize radio 108 to communicate with AP 110 over a first wireless channel and to communicate with P2P device 104 over a second wireless channel.

In step 404, the multi-interface device determines that a difference in time between a transmission of a first beacon by the first device over the first wireless channel and a transmission of a second beacon by the second device over the second wireless channel is less than a predetermined amount of time. The multi-interface device may determine the difference in time based on information received from the first and second devices that relates to beacon transmissions, by observing the time at which beacons are received from the first and second devices, or in some other manner. The predetermined amount of time may be a minimum amount of time required to switch the radio from operating on the first wireless channel to operating on the second wireless channel or some other amount of time.

In step 406, in response to determining that the difference in time between the transmission of the first beacon and the second beacon is less than the predetermined amount of time, the multi-interface device sends a request to either the first device or the second device to shift the transmission of future beacons by a requested offset time. In an embodiment, the requested offset time included in the request is calculated to enable the multi-interface device to utilize the single radio in accordance with a non-overlapping beacon scheme. As explained above, the non-overlapping beacon scheme is a TDM scheme in which each of a continuous series of future beacons transmitted by the first device can be received during time periods in which the single radio is utilized to communicate over the first wireless channel and each of a continuous series of future beacons transmitted by the second device can be received during time periods in which the single radio is utilized to communicate over the second wireless channel.

In one embodiment, sending the request to either the first device or the second device during step 406 comprises sending an action frame request to either the first device or the second device, wherein the action frame request includes the requested offset time. The action frame request may comprise, for example, a management frame in accordance with the 802.11b/g/n/e/ac standard.

Figure 6:
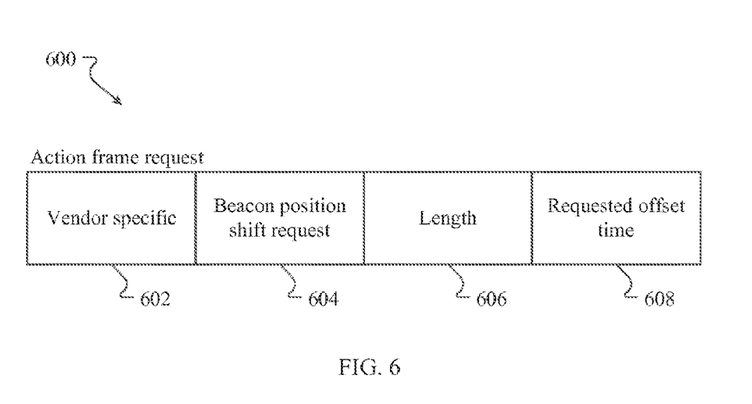
FIG. 6 depicts a format of an example action frame request in accordance with an embodiment.

FIG. 6 depicts a format of an example action frame request 600 in accordance with an embodiment. As shown in FIG. 6, action frame request 600 includes a vendor specific field 602, a beacon position shift request field 604, a length field 606, and a requested offset time field 608. Vendor specific field 602 may contain information associated with a vendor of the multi-interface device or wireless interface logic included therein. Beacon position shift request field 604 may contain a code or other information that indicates that action frame request 600 is a request for the receiving device to shift the transmission time of future beacons. Length field 606 may contain a number that indicates how many bytes of information will follow length field 606 in the action frame request. For example, length field 606 may indicate that four bytes will follow if requested offset time field 608 occupies four bytes of action frame request 600. Requested offset time field 608 contains information that specifies the amount of time that the multi-interface device is requesting the receiving device shift its future beacons by. Such amount of time may be specified, for example, in microseconds. Example action frame request 600 depicted in FIG. 6 is in no way meant to be limiting. Persons skilled in the relevant art(s) will appreciate that the information included therein may be specified in any order, using any units, and may occupy any number of bytes of action frame request 600. Fewer or additional fields may be included in an action frame request as well.

In an embodiment, in response to receiving the request sent during step 406, the first device or second device may send a response to the request that indicates whether the request was rejected or accepted and the multi-interface device receives such response. An example method by which the first or second device may operate to perform this function will now be described in reference to flowchart 500 of FIG. 5. The method of flowchart 500 may be performed, for example, by P2P device 104 or AP 110 as described above in reference to wireless communication system 100 shown in FIG. 1, although the method is not limited to that implementation.

Figure 5:
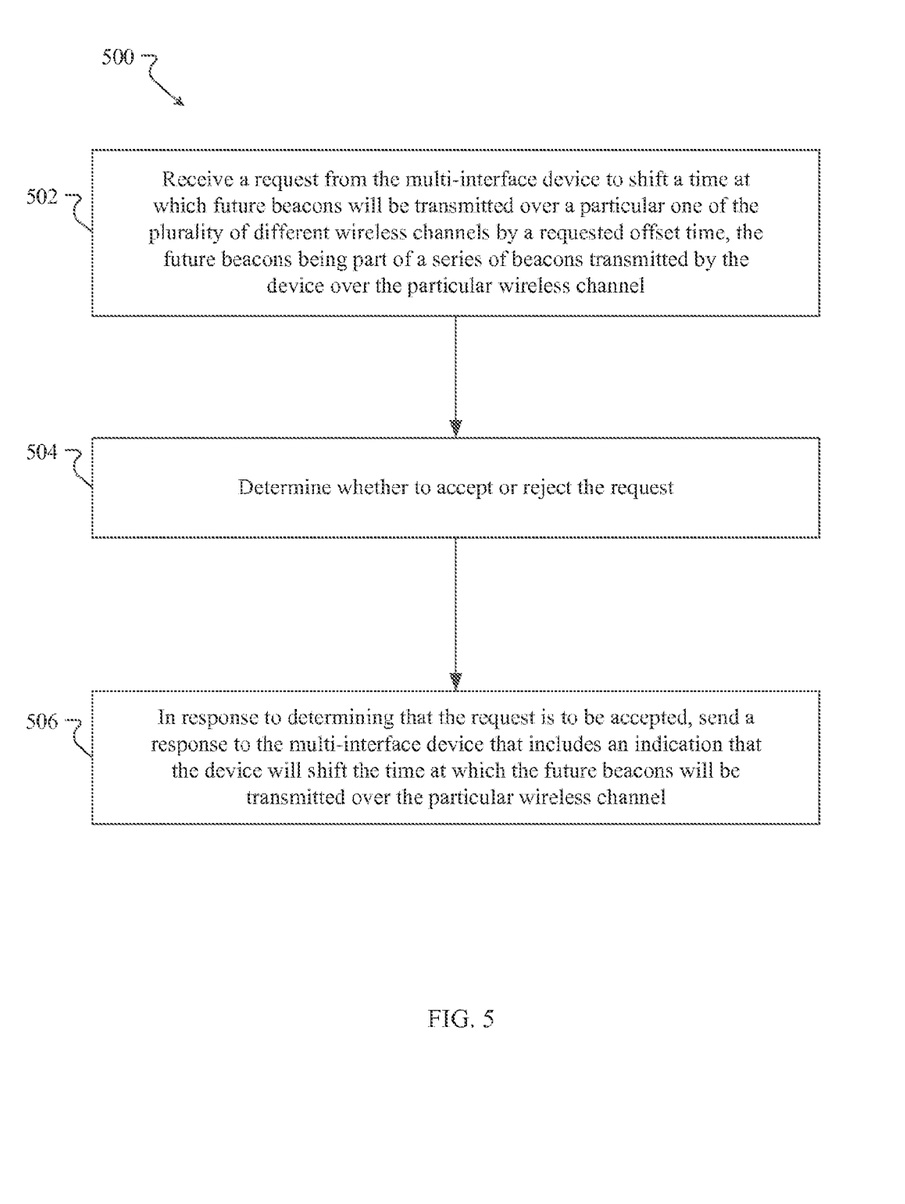
FIG. 5 depicts a flowchart of a method for responding to a request to shift a beacon transmission time that is sent from a multi-interface device that supports multiple wireless interfaces via a single radio in accordance with an embodiment.

As shown in FIG. 5, the method of flowchart 500 begins at step 502. In step 502, the first or second device receives a request from the multi-interface device to shift a time at which future beacons will be transmitted over a particular one of a plurality of different wireless channels by a requested offset time, the future beacons being part of a series of beacons transmitted by the first device or the second device over the particular wireless channel. Such request may comprise, for example, an action frame request as was discussed above in reference to FIG. 6.

In step 504, the first or second device determines whether to accept or reject the request.

In step 506, in response to determining that the request is to be accepted, the first or second device sends a response to the multi-interface device that includes an indication that the first or second device will shift the time at which the future beacons will be transmitted over the particular wireless channel.

In one embodiment, the response that is sent by the first or second device during step 506 comprises an action frame response. Like the action frame request described above in reference to FIG. 6, the action frame response may comprise a management frame in accordance with the 802.11b/g/n/e/ac standard.

Figure 7:
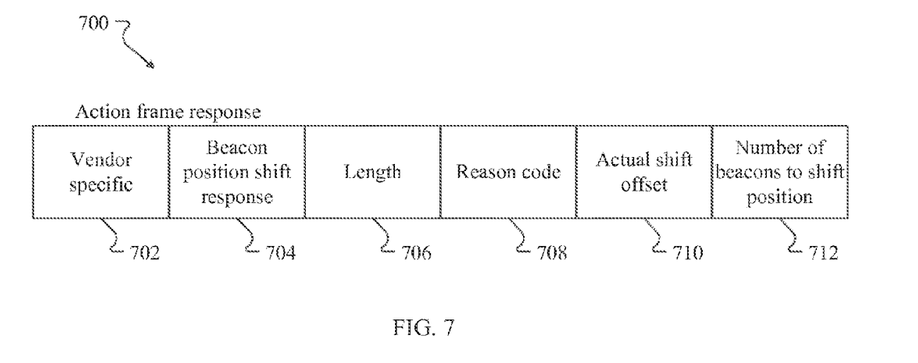
FIG. 7 depicts a format of an example action frame response in accordance with an embodiment.

FIG. 7 depicts a format of an example action frame response 700 in accordance with an embodiment. As shown in FIG. 7, action frame response 700 includes a vendor specific field 702, a beacon position shift response field 704, a length field 706, a reason code field 708, an actual shift offset field 710, and a number of beacons to shift position field 712. Vendor specific field 702 may contain information associated with a vendor of the first or second device or wireless interface logic included therein. Beacon position shift response field 704 may contain a code or other information that indicates that the action frame response is a response to a request to shift the transmission time of future beacons. Length field 706 may contain a number that indicates how many bytes of information will follow length field 706 in the action frame response. Reason code field 708 may contain a code or other information that indicates whether the responding device accepts or rejects the request to shift the transmission time of future beacons. In embodiments, the code or information contained in reason code field 708 may also indicate a reason why the request was accepted or rejected. For example, the first or second device may reject the request because another device has already requested a shift. In a case in which the request is accepted, actual shift offset field 710 may contain an indication of an actual offset time by which the requested device will shift the transmission of future beacons. The actual offset time may be the same as the requested offset time or a different time. The actual offset time may be specified, for example, in microseconds. Number of beacons to shift position field 712 may contain information that indicates a number of interim beacons that will be transmitted by the first or second beacon before the transmission time of future beacons is shifted. Example action frame response 700 depicted in FIG. 7 is in no way meant to be limiting. Persons skilled in the relevant art(s) will appreciate that the information included therein may be specified in any order, using any units, and may occupy any number of bytes of action frame response 700. Fewer or additional fields may be included in an action frame response as well.

After sending the response in step 506, the first or second device may send a number of interim beacons before it shifts the transmission time of future beacons. As noted above in reference to FIG. 7, the response sent in step 506 may specify the number of interim beacons that will be transmitted by the first or second device before it shifts the transmission time of future beacons.

Figure 8:
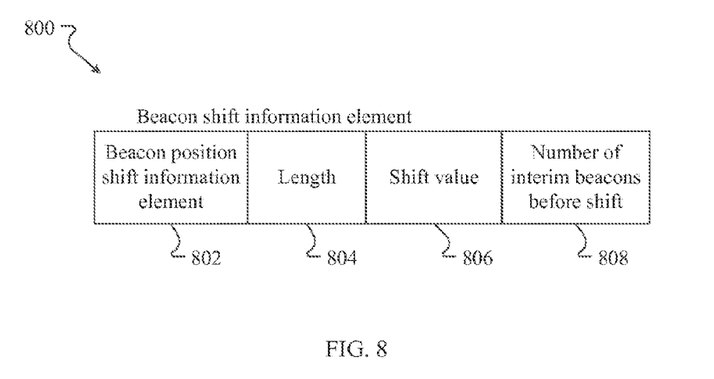
FIG. 8 depicts a format of an example beacon shift information element that may be included in an interim beacon in accordance with an embodiment.

In an embodiment, each interim beacon includes a beacon shift information element. FIG. 8 depicts the format of an example beacon shift information element 800 in accordance with an embodiment. As shown in FIG. 8, beacon shift information element 800 includes a beacon position shift information element field 802, a length field 804, a shift value field 806, and a number of interim beacons before shift field 808. Beacon position shift information element field 802 may contain a code or other information that indicates that the information element relates to an upcoming beacon position shift. Length field 804 may contain a number that indicates how many bytes of information will follow length field 804 in the information element. Shift value field 806 may contain an indication of an actual offset time by which the device sending the interim beacon will shift the transmission of future beacons. The actual offset time may be specified, for example, in microseconds. Number of interim beacons before shift field 808 may contain a number that specifies how many more interim beacons will be transmitted before the transmission time of future beacons will be shifted. Example beacon shift information element 800 depicted in FIG. 8 is in no way meant to be limiting. Persons skilled in the relevant art(s) will appreciate that the information included therein may be specified in any order, using any units, and may occupy any number of bytes of beacon shift information element 800. Fewer or additional fields may be included in a beacon shift information element as well.

Upon receiving the response transmitted by the first or second device during step 506, the multi-interface device may perform different operations depending upon the nature of the response. For example, if the multi-interface device determines from the response that the first or second device has accepted the request, the multi-interface device may subsequently utilize the single radio in accordance with a non-overlapping beacon TDM scheme as was described above. The multi-interface device may implement such a scheme after the first or second device shifts the transmission time of future beacons. As noted above, a non-overlapping beacon TDM scheme is one in which each of a continuous series of future beacons transmitted by the first device can be received during time periods in which the single radio is utilize to communicate over the first wireless channel, and each of a continuous series of future beacons transmitted by the second device can be received during time periods in which the single radio is utilized to communicate over the second wireless channel.

However, in response to determining that the first device or the second device has rejected the request, the multi-interface device may instead utilize the single radio in accordance with an overlapping beacon TDM scheme as was described above. As noted above, an overlapping beacon TDM scheme is one in which only a subset of a continuous series of future beacons transmitted by the first device can be received during time periods in which the single radio is used to communicate over the first wireless channel, and only a subset of a continuous series of future beacons transmitted by the second device can be received during time periods in which the single radio is used to communicate over the second wireless channel.

Figure 9:
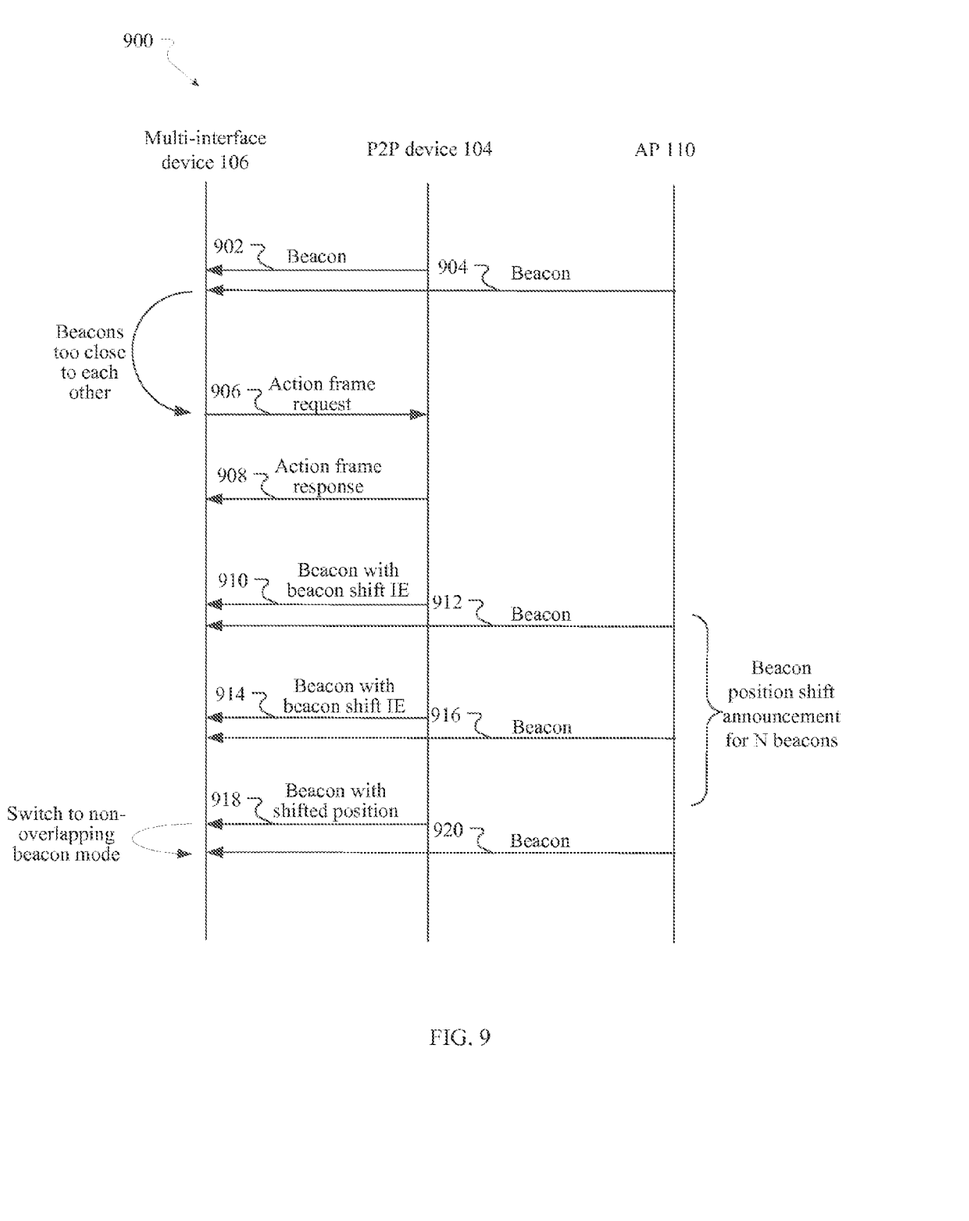
FIG. 9 depicts a sequence diagram that illustrates a protocol that may be carried out between a multi-interface device, a P2P device and an AP in order to enable the multi-interface device to operate in a non-overlapping beacon mode.

FIG. 9 depicts a sequence diagram 900 that provides one example of how the foregoing protocol may be carried out between multi-interface device 106, P2P device 104 and AP 110 in order to enable multi-interface device 106 to operate in a non-overlapping beacon mode. Sequence diagram 900 is described herein by way of example only. Persons skilled in the relevant art(s) will appreciate that other sequences of interactions may be carried out to practice the embodiments described herein.

As shown in FIG. 9, P2P device 104 sends a first beacon 902 to multi-interface device 106 over a first wireless channel and AP 110 sends a second beacon 904 to multi-interface device 106 over a second wireless channel. Multi-interface device 106 determines that the first and second beacons have been transmitted too close together in time. As a result, multi-interface device 106 sends an action frame request 906 to P2P device 104, requesting that P2P device 104 shift the time that it transmits its beacons by a requested offset time. Action frame request 906 may be formatted in the manner described above in reference to FIG. 6. It is noted that in an alternate sequence, multi-interface device 106 could send an action frame request to AP 110 instead, requesting that AP 110 shift the time that it transmits its beacons by a requested offset time.

In response to receiving action frame request 906, P2P device 104 sends an action frame response 908 to multi-interface device 106 indicating that it has accepted the request and that it will shift the transmission of future beacons by an actual offset time that is specified in the response. Action frame response 908 may be formatted in the manner described above in reference to FIG. 7. As previously noted, action frame response 908 may specify a number of interim beacons that will be transmitted by P2P device 104 before it shifts its beacon transmission time. These interim beacons are shown as interim beacon 910 and interim beacon 914 in sequence diagram 900. Interim beacons 910 and 914 are transmitted by P2P device 104 in close temporal proximity to beacons 912 and 916 transmitted by AP 110, as the requested shift in transmission time has not yet been implemented by P2P device 104. Each interim beacon 910 and 914 may include a beacon shift information element formatted in the manner described above in reference to FIG. 8. As noted in FIG. 9, there may be N interim beacons transmitted by P2P device 104, wherein N is an integer greater than or equal to 0.

Eventually, P2P device 104 transmits a beacon 918 that has been time shifted in accordance with the actual offset time specified in action frame response 908. Such beacon 918 is spaced sufficiently apart in time with respect to a beacon 920 transmitted by AP 110 that multi-interface device 106 can switch to a non-overlapping beacon mode of operation. Such switch is shown at the bottom of sequence diagram 900.

It is to be understood that an interaction similar to that carried out between multi-interface device 106 and P2P device 104 in sequence diagram 900 could be carried out between multi-interface 106 and AP device 110, thereby resulting in AP device 110 shifting the transmission time of its beacons. In certain scenarios, P2P device 104 or AP device 110 may reject an action frame request received from multi-interface device 106. In such a scenario, multi-interface device 106 may send an action frame request to the other device. In such a scenario, multi-interface device 106 may also wait a predetermined amount of time and then sends another action frame request to the same device. Still other implementations are possible.

Figure 10:
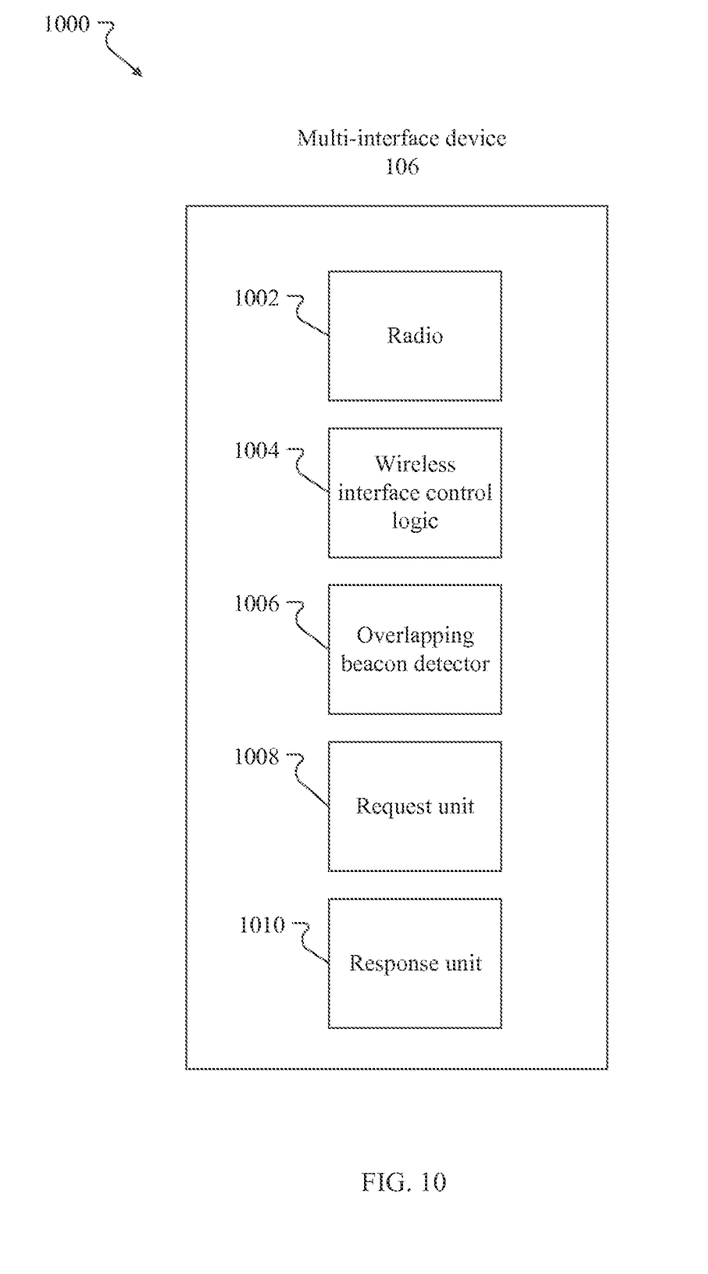
FIG. 10 is a block diagram that shows an example multi-interface device that supports multiple wireless interfaces via a single radio in accordance with an embodiment.

FIG. 10 is a block diagram that shows an example multi-interface device 1000 that supports multiple wireless interfaces via a single radio in accordance with an embodiment. Multi-interface device 1000 may be one example implementation of multi-interface device 106 described above in reference to FIG. 1. As shown in FIG. 10, multi-interface device 1000 includes a radio 1002, wireless interface control logic 1004, an overlapping beacon detector 1006, a request unit 1008, and a response unit 1010. Each of these components may be implemented in hardware, using digital and/or analog circuits, in software executing upon a suitable processing unit, or as a combination thereof.

In an embodiment, wireless interface control logic 1004 is configured to provide multiple wireless interfaces to an entity (e.g., an operating system stack) within multi-interface device 1000 via radio 1002. Such wireless interfaces include at least a first wireless interface for communicating over a first wireless channel and a second wireless interface for communicating over a second wireless channel.

Overlapping beacon detector 1006 is configured to determine that a difference in time between a transmission of first beacon by a first device over the first wireless channel and a transmission of a second beacon by a second device over the second wireless channel is less than a predetermined amount of time.

Request unit 1008 is configured to send a request from multi-interface device 1000 to either the first device or the second device to shift the sending of future beacons by a requested offset time in response to the determination by overlapping beacon detector 1006 that the difference in time is less than the predetermined amount of time. The requested offset time may be calculated to enable wireless interface control logic 1004 to utilize radio 1002 in accordance with a non-overlapping beacon TDM scheme. As discussed above, a non-overlapping beacon TDM scheme is one in which each of a continuous series of future beacons transmitted by the first device can be received during time periods in which radio 1002 is utilized to communicate over the first wireless channel and each of a continuous series of future beacons transmitted by the second device can be received during time periods in which radio 1002 is utilized to communicate over the second wireless channel.

Response unit 1010 is configured to receive from either the first device or the second device a response to the request sent to either the first device or the second device. Response unit 1010 is further configured to determine from the response whether the first device or the second device has accepted or rejected the request.

Wireless interface control logic 1004 is configured such that, in response to a determination by response unit 1010 that the first device or the second device has accepted the request, it will utilize radio 1002 in accordance with a non-overlapping beacon TDM scheme. Wireless interface control logic 1004 is also configured such that, in response to a determination by response unit 1010 that the first device or second device has rejected the request, it will utilize radio 1002 in accordance with an overlapping beacon TDM scheme. As discussed above, an overlapping beacon TDM scheme is one in which only a subset of a continuous series of future beacons transmitted by the first device can be received during time periods in which radio 1002 is utilized to communicate over the first wireless channel and only a subset of a continuous series of future beacons transmitted by the second device can be received during time periods in which the radio is utilized to communicate over the second wireless channel.

C. Example Software Implementation

Figure 11:
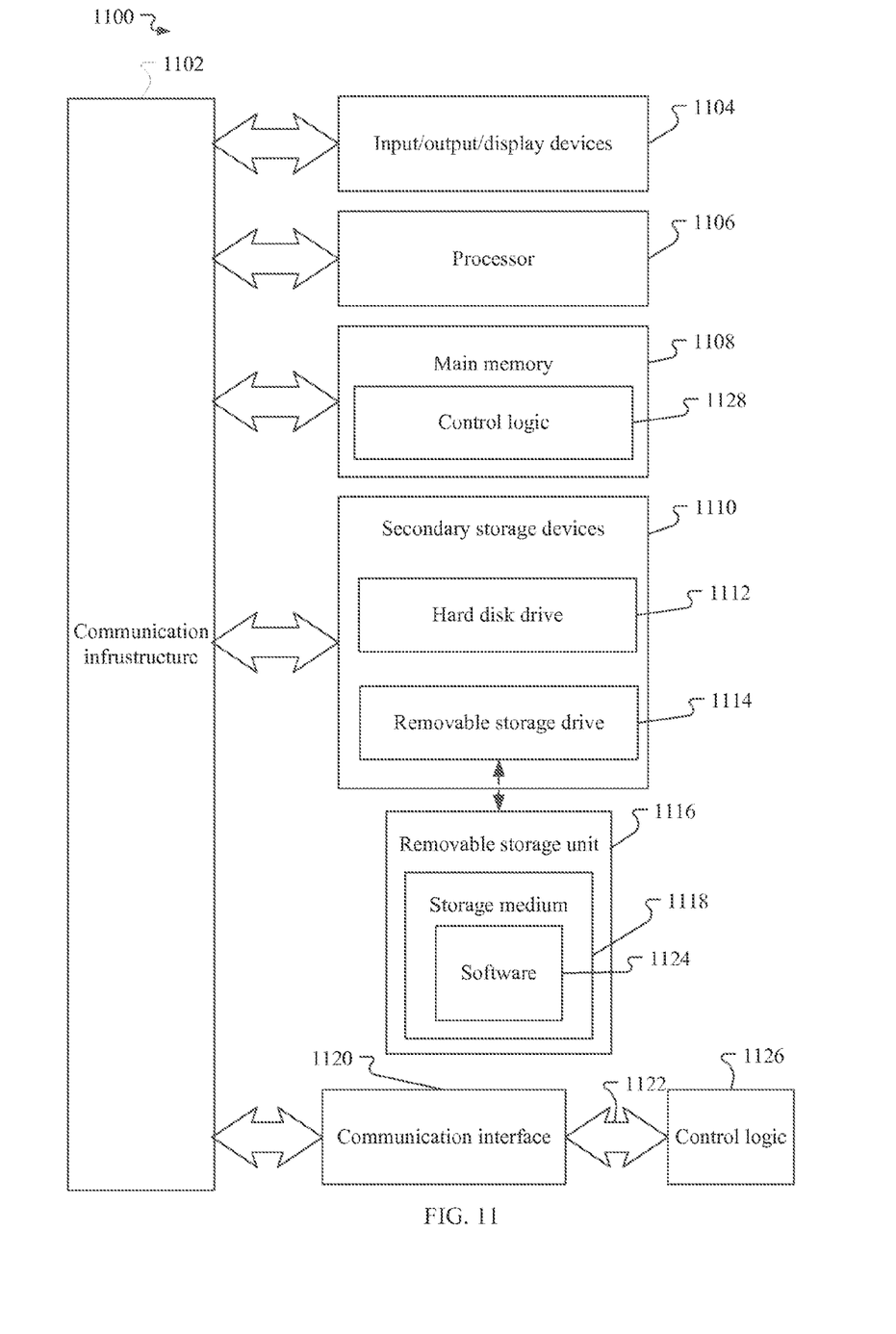
FIG. 11 is a block diagram of an example computer that may be used to implement certain embodiments described herein.

The embodiments described herein, including systems, methods/processes, and/or apparatuses, may be implemented in software using well-known computers or microprocessors. One example of a computer that may be used to implement embodiments is computer 1100 of FIG. 14, which is described herein for the sake of completeness. Any of the features of P2P device 104, multi-interface device 106, AP 110, servers 114, and multi-interface device 1000, and any of the steps of flowchart 400, flowchart 500, or sequence diagram 900 may be implemented using one or more computers 1100.

Computer 1100 can be any commercially available and well known computer capable of performing operations described herein, such as computers available from International Business Machines, Apple, Sun, HP, Dell, Cray, etc. Computer 1100 may be any type of computer, including a desktop computer, a server, etc.

As shown in FIG. 11, computer 1100 includes one or more processors (e.g., central processing units (CPUs)), such as processor 1106. Processor 1106 is connected to a communication infrastructure 1102, such as a communication bus. In some embodiments, processor 1106 can simultaneously operate multiple computing threads.

Computer 1100 also includes a primary or main memory 1108, such as a random access memory (RAM). Main memory 1108 has stored therein control logic 1128 (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such as a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1124 (control logic) and/or data. Removable storage unit 1116 represents a floppy disk, magnetic tape, compact disc (CD), digital versatile disc (DVD), Blue-ray disc, optical storage disk, memory stick, memory card, or any other computer data storage device. Removable storage drive 1114 reads from and/or writes to removable storage unit 1116 in a well-known manner.

Computer 1100 also includes input/output/display devices 1104, such as monitors, keyboards, pointing devices, microphones, motion capture devices, etc.

Computer 1100 further includes a communication interface 1120. Communication interface 1120 enables computer 1100 to communicate with remote devices. For example, communication interface 1120 allows computer 1100 to communicate over communication networks or mediums 1122 (representing a form of a computer useable or readable medium), such as wireless local area networks (WLANs), local area networks (LANs), wide area networks (WANs), the Internet, etc. Communication interface 1120 may interface with remote sites or networks via wired or wireless connections. Examples of communication interface 1120 include but are not limited to a modem, a network interface card (e.g., an Ethernet card), a wireless network card (including WiFi, Bluetooth, WIMAX, or any other wireless protocol), a communication port, a Personal Computer Memory Card International Association (PCMCIA) card, etc.

Control logic 1126 may be transmitted to and from computer 1100 via communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments of the application.

For example, any of the features of P2P device 104, multi-interface device 106, AP 110, servers 114, and multi-interface device 1000, and any of the steps of flowchart 400, flowchart 500, or sequence diagram 900 can be implemented as control logic that may be stored on a computer useable medium or computer readable medium, which can be executed by one or more processors to operate as described herein.

Computer readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for controlling beacon reception in a multi-interface device that supports multiple wireless interfaces via a single radio, comprising:
   utilizing the single radio to communicate with a first device over a first wireless channel and to communicate with a second device over a second wireless channel;
   determining that a difference in time between a transmission of a first beacon by the first device over the first wireless channel and a transmission of a second beacon by the second device over the second wireless channel is less than a predetermined amount of time; and
   in response to determining that the difference in time is less than the predetermined amount of time, sending a request from the multi-interface device to either the first device or the second device to shift the transmission of future beacons by a requested offset time.

2. The method of claim 1, wherein the requested offset time is calculated to enable the multi-interface device to utilize the single radio in accordance with a time division multiplexing (TDM) scheme by which each of a continuous series of future beacons transmitted by the first device can be received during time periods in which the single radio is utilized to communicate over the first wireless channel and each of a continuous series of future beacons transmitted by the second device can be received during time periods in which the single radio is utilized to communicate over the second wireless channel.

3. The method of claim 1, wherein sending the request from the multi-interface device to either the first device or the second device comprises:
   sending an action frame request to either the first device or the second device, the action frame request including the requested offset time.

4. The method of claim 1, further comprising:
   receiving from either the first device or the second device a response to the request sent to either the first device or the second device, the response indicating whether the request was rejected or accepted.

5. The method of claim 4, wherein the response comprises an action frame response that includes a response code that indicates whether the request has been rejected or accepted and, if the request has been accepted, an actual offset time by which future beacons will be shifted.

6. The method of claim 5, wherein, if the request has been accepted, the action frame response further includes a number of interim beacons that will be transmitted by either the first device or the second device before the future beacons are shifted by the actual offset time.

7. The method of claim 4, further comprising:
   determining from the response whether the first device or the second device has accepted or rejected the request; and
   in response to determining that the first device or the second device has accepted the request, utilizing the single radio in accordance with a time division multiplexing (TDM) scheme by which each of a continuous series of future beacons transmitted by the first device can be received during time periods in which the single radio is utilized to communicate over the first wireless channel and each of a continuous series of future beacons transmitted by the second device can be received during time periods in which the single radio is utilized to communicate over the second wireless channel.

8. The method of claim 7, further comprising:
   in response to determining that the first or second device has rejected the request, utilizing the single radio in accordance with a TDM scheme by which only a subset of a continuous series of future beacons transmitted by the first device can be received during time periods in which the single radio is utilized to communicate over the first wireless channel and only a subset of a continuous series of future beacons transmitted by the second device can be received during time periods in which the single radio is utilized to communicate over the second wireless channel.

9. The method of claim 1, wherein the first channel is on a first frequency band and the second channel is on a second frequency band.

10. The method of claim 1, wherein the first wireless channel and the second wireless channel comprise wireless local area network channels.

11. A method performed by a device for responding to a request from a multi-interface device that supports multiple wireless interfaces via a single radio, each of the wireless interfaces being operable to communicate over one of a plurality of different wireless channels, the method comprising:
   receiving a request from the multi-interface device to shift a time at which future beacons will be transmitted over a particular one of the plurality of different wireless channels by a requested offset time, the future beacons being part of a series of beacons transmitted by the device over the particular wireless channel;
   determining whether to accept or reject the request; and in response to determining that the request is to be accepted, sending a response to the multi-interface device that includes an indication that the device will shift the time at which the future beacons will be transmitted over the particular wireless channel.

12. The method of claim 11, wherein the response further includes an actual offset time indicating an amount of time by which the transmission of the future beacons will be shifted.

13. The method of claim 12, wherein the response further includes a number of interim beacons that will be transmitted by the device before the future beacons are shifted by the actual offset time.

14. The method of claim 13, further comprising:
sending the interim beacons from the device over the particular wireless channel, each interim beacon including an information element that specifies a number of interim beacons that remain before the future beacons are shifted by the actual offset time.

15. A multi-interface device, comprising:
a radio;
wireless interface control logic configured to provide multiple wireless interfaces via the radio, the wireless interfaces including a first wireless interface for communicating over a first wireless channel and a second wireless interface for communicating over a second wireless channel;
an overlapping beacon detector configured to determine that a difference in time between a transmission of a first beacon by a first device over the first wireless channel and a transmission of a second beacon by a second device over the second wireless channel is less than a predetermined amount of time; and
a request unit configured to send a request from the multi-interface device to either the first device or the second device to shift the sending of future beacons by a requested offset time in response to the determination that the difference in time is less than the predetermined amount of time.

16. The multi-interface device of claim 15, wherein the requested offset time is calculated to enable the wireless interface control logic to utilize the radio in accordance with a time division multiplexing (TDM) scheme by which each of a continuous series of future beacons transmitted by the first device can be received during time periods in which the radio is utilized to communicate over the first wireless channel and each of a continuous series of future beacons transmitted by the second device can be received during time periods in which the radio is utilized to communicate over the second wireless channel.

17. The multi-interface device of claim 15, further comprising:
a response unit configured to receive from either the first device or the second device a response to the request sent to either the first device or the second device, the response indicating whether the request was rejected or accepted.

18. The multi-interface device of claim 17, wherein the response unit is further configured to:
determine from the response whether the first device or the second device has accepted or rejected the request, wherein the wireless interface control logic is further configured to, in response to a determination by the response unit that the first device or the second device has accepted the request, utilize the radio in accordance with a time division multiplexing (TDM) scheme by which each of a continuous series of future beacons transmitted by the first device can be received during time periods in which the radio is utilized to communicate over the first wireless channel and each of a continuous series of future beacons transmitted by the second device can be received during time periods in which the radio is utilized to communicate over the second wireless channel.

19. The multi-interface device of claim 17, wherein the wireless interface control logic is further configured to, in response to a determination by the response unit that the first device or the second device has rejected the request, utilize the radio in accordance with a TDM scheme by which only a subset of a continuous series of future beacons transmitted by the first device can be received during time periods in which the radio is utilized to communicate over the first wireless channel and only a subset of a continuous series of future beacons transmitted by the second device can be received during time periods in which the radio is utilized to communicate over the second wireless channel.

20. The multi-interface device of claim 15, wherein the first wireless channel and the second wireless channel comprise wireless local area network channels.

* * * * *